United States Patent [19]

Pasch

[11] 3,833,323
[45] Sept. 3, 1974

[54] SEGMENTAL MOLD
[75] Inventor: Lambert Pasch, Nutheim, Germany
[73] Assignee: Uniroyal AG, Aachen, Germany
[22] Filed: Feb. 26, 1973
[21] Appl. No.: 335,827

[52] U.S. Cl. .................................... 425/47, 425/46
[51] Int. Cl. ............................................. B26h 5/02
[58] Field of Search .............. 425/42, 45, 46, 47, 17

[56] References Cited
UNITED STATES PATENTS

| 3,082,480 | 3/1963 | Balle ..................................... 425/46 |
| 3,396,221 | 8/1968 | Balle et al. ......................... 425/43 X |
| 3,460,197 | 8/1969 | Contorutti et al. ................... 425/46 |
| 3,464,090 | 9/1969 | Contorutti ......................... 425/46 X |
| 3,659,976 | 5/1972 | Yavorsky et al. ..................... 425/42 |
| 3,682,576 | 8/1972 | Gross .................................. 425/46 |
| 3,703,346 | 11/1972 | Deboeur et al. ...................... 425/46 |
| 3,713,929 | 1/1973 | Bottasso et al. ................... 425/45 X |

FOREIGN PATENTS OR APPLICATIONS

| 1,169,118 | 4/1964 | Germany ............................. 425/17 |
| 1,919,884 | 3/1971 | Germany ............................. 425/46 |
| 1,917,081 | 4/1969 | Germany ............................. 425/47 |

Primary Examiner—J. Howard Flint, Jr.
Attorney, Agent, or Firm—Philip Sands, Esq.

[57] ABSTRACT

A segmental mold comprising a pair of sidewall-shaping members coaxially confronting one another and supported such that at least one is movable axially relative to the other, and an annular array of tread-shaping segments concentrically interposed between the members and supported for movement axially in parallel relation and radially from an open annular array wherein the segments are spaced from one another to a closed annular array of reduced extent wherein the segments abut one another. The segments are commonly associated with one of the members through the intermediary of loosely associated mutually interfitting portions so as to effect a reduction in sliding friction therebetween.

13 Claims, 13 Drawing Figures

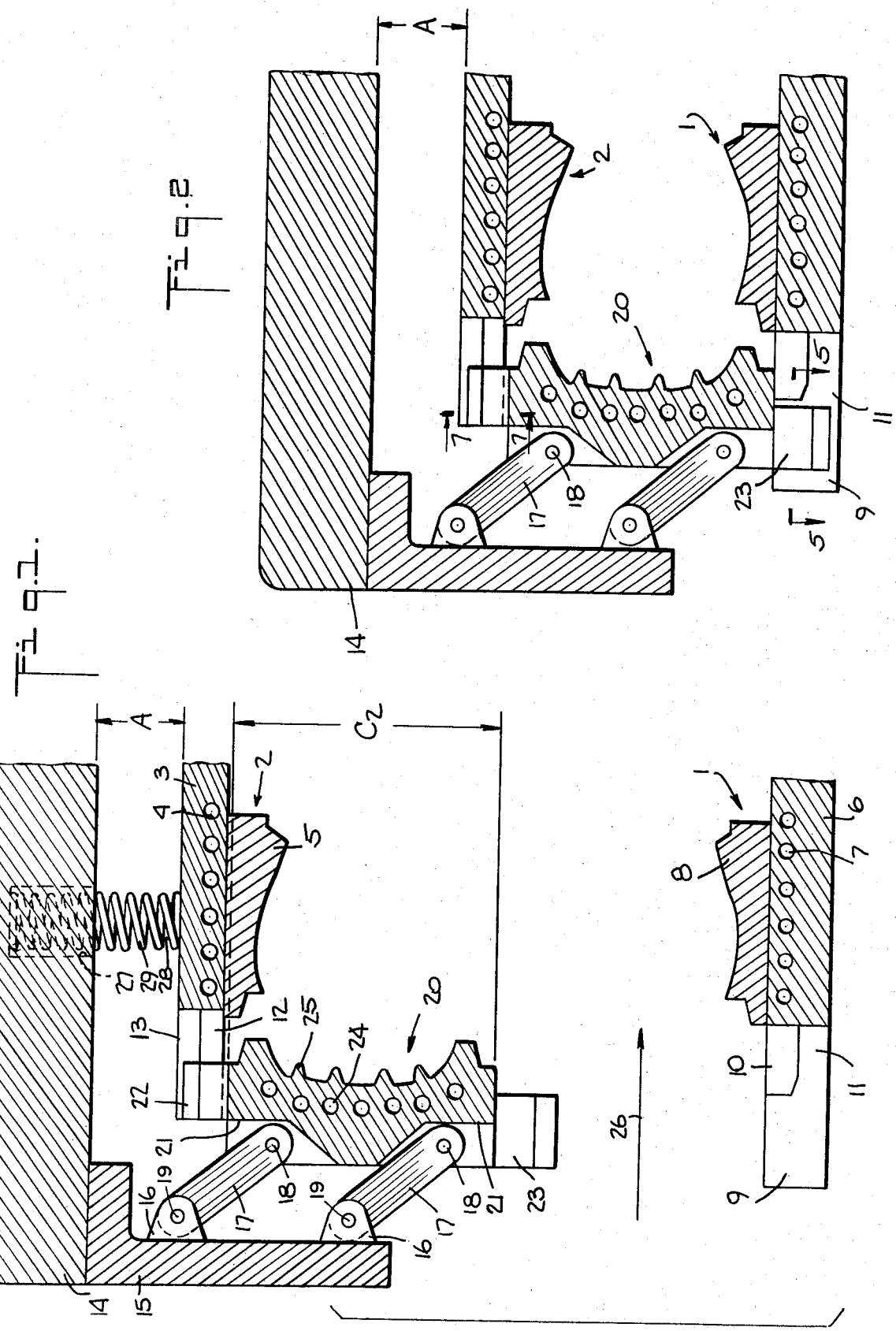

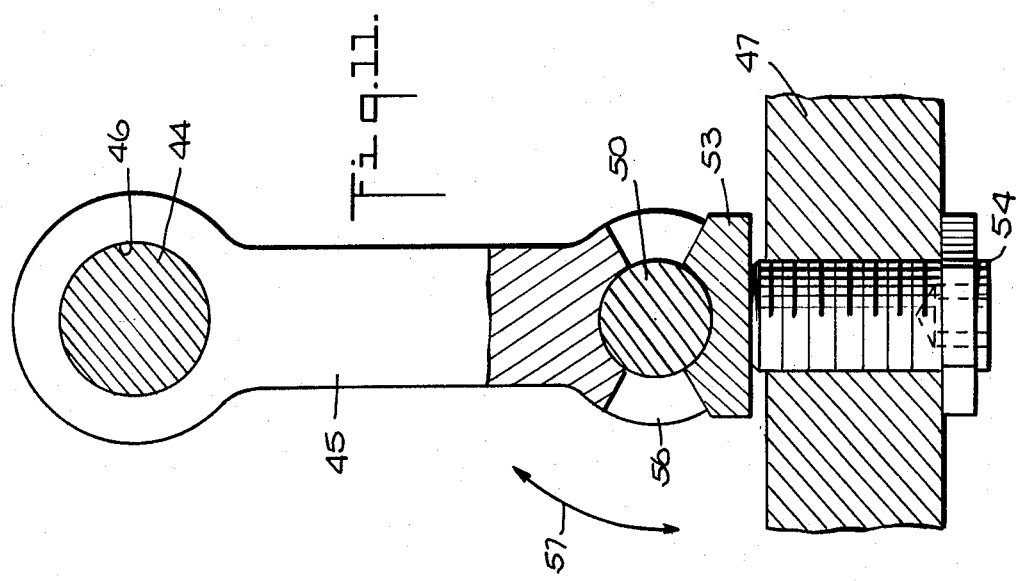
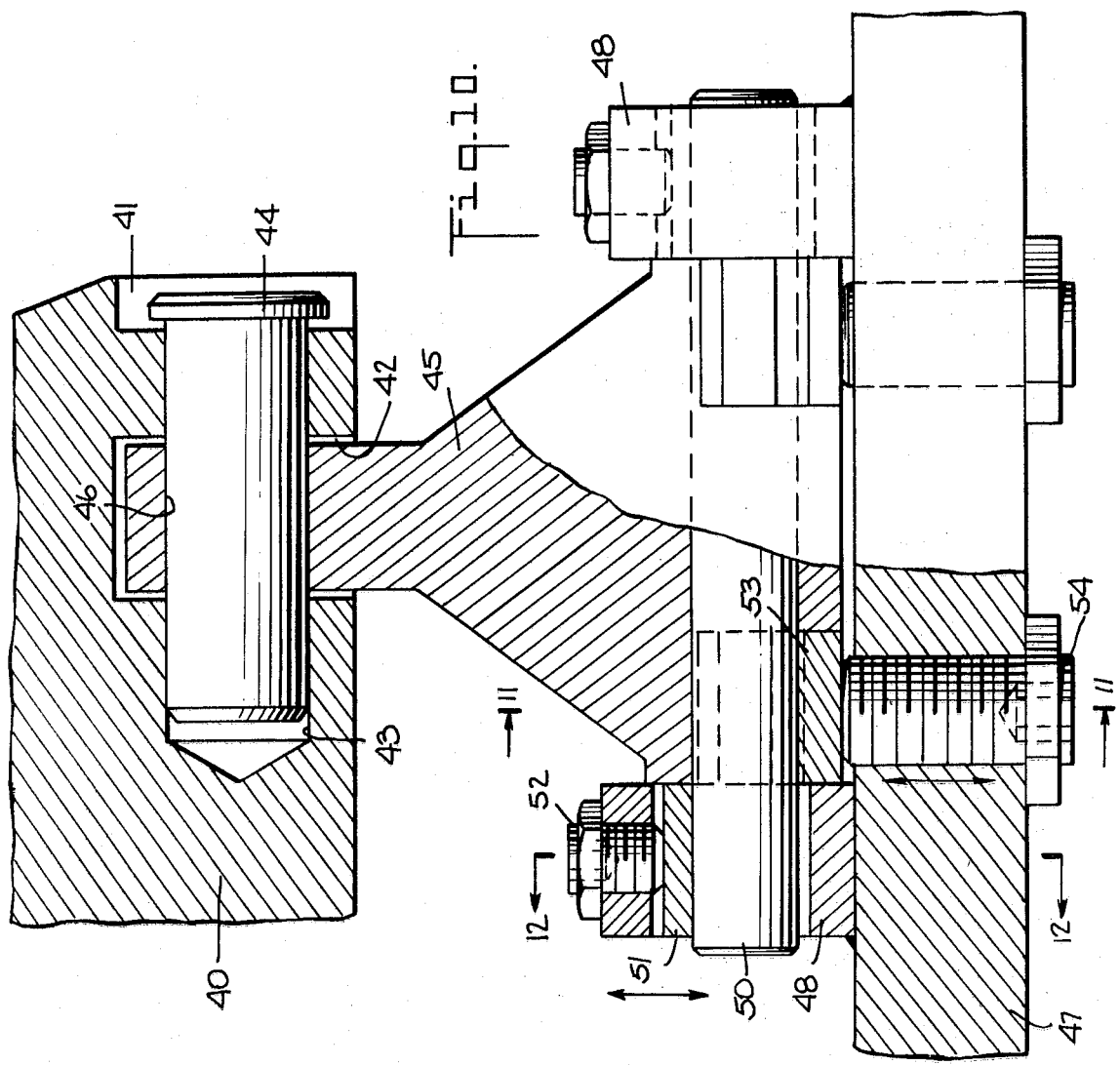

SEGMENTAL MOLD

BACKGROUND OF THE INVENTION

The present invention relates generally to tire curing presses, and more particularly to tire curing presses of the segmental mold variety.

Segmental molds in general are well known and usually comprise a pair of tire sidewall-shaping members between which is interposed an annular array of tire tread-shaping segments. The segments are movable radially from an open annular array wherein they are spaced from one another to a closed annular array of reduced extent wherein they abut one another. The sidewall-shaping members are movable axially toward and away from one another and often can be tilted to permit the insertion of an uncured tire carcass, or raw tire, therebetween. Presses of this nature employ an inflatable bladder for at least partially inflating the raw tire during the last stage of movement of the tread-shaping segments radially into a closed annular array, and thereafter for fully inflating the raw tire when the mold is in a completely closed condition to permit curing and vulcanization of the carcass.

It is a conventional expedient to provide the aforementioned presses with means for effecting radial displacement of the tread-shaping segments from an open annular array to a closed annular array of reduced extent as the sidewall-shaping members are axially moved into increasing proximity with one another and into opposing axial engagement with the tread-shaping segments. The means for achieving such an effect usually comprise various camming assemblies formed in one or the other of the sidewall-shaping members, and follower members slidably associated with the camming assemblies and connected to the tread-shaping segments, respectively.

One disadvantage associated with this arrangement is that the tread-shaping segments may reach their final radially inward position prior to the sidewall-shaping members reaching their final position in axially abutting association with the segments. Since the carcass is usually at least partially inflated during the aforementioned movement of the tread-shaping segments, the segments may be moved in various directions relative to one another and not remain commonly constrained against substantial non-uniform movement as the sidewall-shaping members are finally moved into abutting relation therewith. As a result, the tread-shaping segments may not impart a precise tread-groove impression into the partially inflated, uncured, carcass, thereby jeopardizing the quality of the tire.

On the other hand, the sidewall-shaping members may be moved into their final axially confronting position with one another prior to the movement of the tread-shaping segments into their final radially inward position. This necessitates the requirement to overcome sliding friction between the tread-shaping segments and the sidewall-shaping members. As a result, lubrication of the surfaces which slide relative to one another is often necessary. However, because of the juxtaposition and general inaccessibility of the sliding surfaces, the latter are difficult to properly lubricate. Failure to effectively lubricate these surfaces may result in the rapid wear of the parts which slide relative to one another and in undesirable non-uniform high temperatures during the initial inflation of the uncured tire carcass. Moreover, excessive force may be necessary for purposes of overcoming the sliding friction, this necessitating the use of expensive and complex equipment.

SUMMARY OF THE INVENTION

Accordingly, it is an object of the present invention to provide a segmental mold in which the sidewall-shaping members and tread-shaping segments are movable in sliding relation with one another, yet in a manner which greatly reduces the friction generated by the portions which slide relative to one another.

It is another object of the present invention to provide means for permitting movement of the sidewall-shaping members and tread-shaping segments relative to one another into the formation of a tightly sealed mold cavity in such a manner that excessive radially directed forces need not be generated against the tread-shaping segments.

To this end, the present invention relates to a segmental mold having a pair of axially confronting sidewall-shaping members, and an annular array of tread-shaping segments interpositioned between the sidewall-shaping members. The tread-shaping segments are slidingly connected loosely to one of the sidewall-shaping members in such a manner that, during radial movement of the segments into a closed annular array, the segments may be moved slightly axially relative to at least the sidewall-shaping member to which they are commonly connected, thereby reducing the extent of sliding friction therebetween.

BRIEF DESCRIPTION OF THE DRAWINGS

The above and additional objects and advantages of this invention will be more clearly understood from the following detailed description thereof when read in conjunction with the accompanying drawings, in which:

FIG. 1 is a fragmentary, vertical or axially taken, cross-sectional view of the segmental mold of the present invention in an open condition;

FIG. 2 is a view similar to FIG. 1, wherein the mold is in an initial partially closed condition;

FIG. 10 is an enlarged, fragmentary, partial cross-sectional view of a preferred embodiment of a typical link interconnecting the respective tread-shaping segments to the upper press platen;

FIG. 11 is a fragmentary, partial cross-sectional view taken along the line 11—11 in FIG. 10;

DETAILED DESCRIPTION OF THE INVENTION

Figure 3:
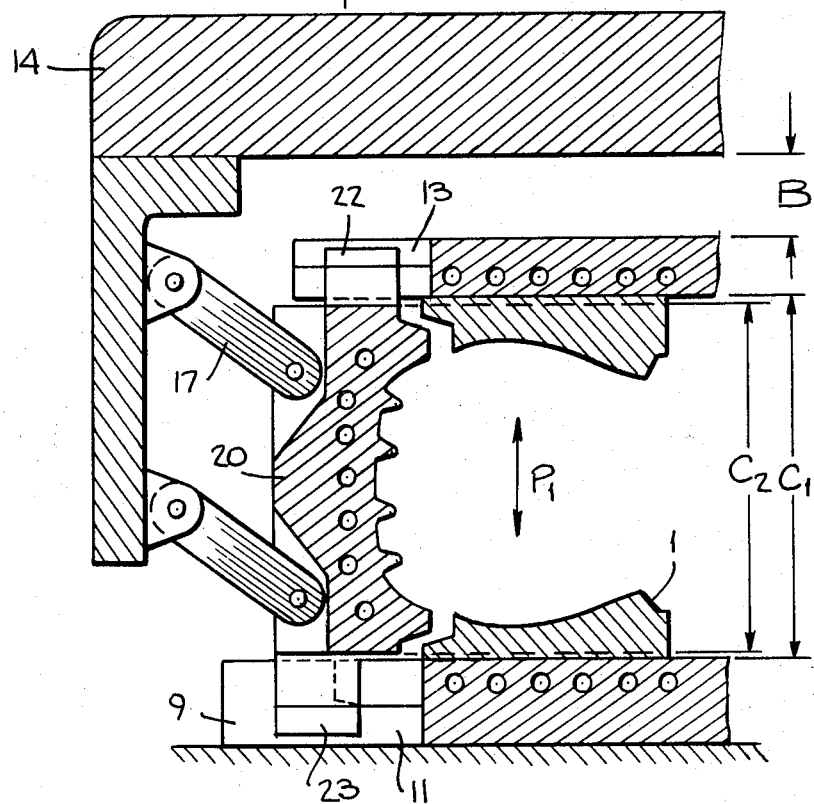
FIG. 3 is a view similar to FIG. 2, wherein the mold is an intermediary partially closed condition.

Referring now to the drawings, and more particularly to FIGS. 1–4, the present invention relates to a segmental mold having a lower mold assembly 1, and an upper mold assembly 2. Interposed between the upper and lower assemblies is an annular array of tread-shaping segments, only a typical one of which is shown at 20. In the preferred embodiment, the lower assembly 1 is stationary and supported by conventional means (not shown). On the other hand, the upper mold assembly 2 is operatively associated with an upper platen 14 which can be moved axially toward and away from the stationary lower mold assembly 1.

The platen 14 is provided with an axially extending annular-like member, or skirt, 15 which extends downwardly toward the lower mold assembly 1 and surrounds the tread-shaping segments 20. Respective pairs of links 17 are provided for interconnecting the tread-shaping segments 20 to the skirt 15. Each of the links 17 is secured at one end by pins 18 in recesses 21 of the segments 20, and at the other end by pins 19 to respective brackets 16 which extend inwardly of the skirt 15. The segments 20, their respective pairs of links 17 and the skirt 15 define what may be characterized as a quadradic linkage. Thus, the links 17 of each pair always remain parallel to one another to effect movement of the segment 20 secured thereto both axially and radially of the assembly.

The upper mold portion 2 comprises a circular or disc-shaped plate 3 in which are provided heating ducts 4 for confining a heating medium supplied by an external source (not shown). Secured to the underside of the plate 3 is an annular tire sidewall-shaping member 5 having a profile which corresponds to the sidewall of a pneumatic tire. Coaxially confronting the sidewall-shaping member 5 and fixedly secured to the lower mold assembly 1, is a second tire sidewall-shaping member 8 of annular extent which likewise is provided with a profile corresponding to the opposite sidewall of a pneumatic tire.

Figure 7:
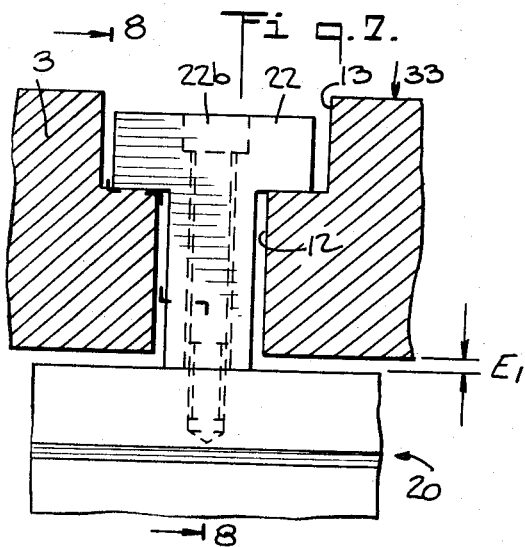
FIG. 7 is an enlarged, fragmentary, partial cross-sectional view taken along the line 7—7 in FIG. 2, and illustrates the upper portion of the typical segment and an open-headed, T-shaped slot in the upper sidewall-shaping member in and along which the upper portion of the typical segment slidably moves.
Figure 8:
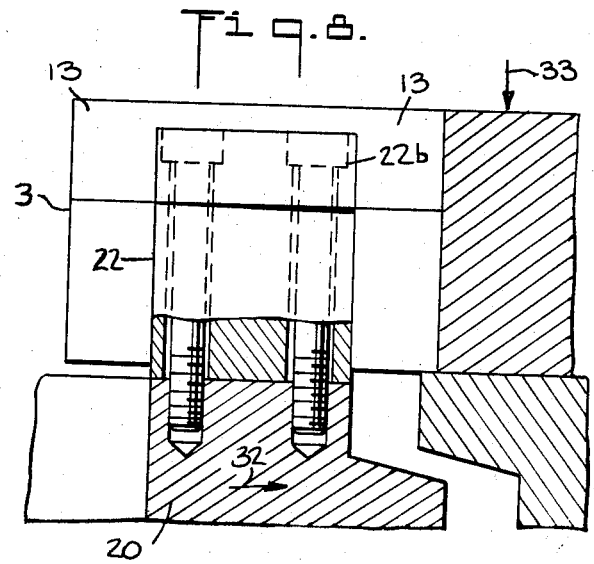
FIG. 8 is a cross-sectional view taken along the line 8—8 in FIG. 7.

As best illustrated in FIGS. 7 and 8, the upper portion of each of the segments 20 is provided with a coupling member 22 which is generally T-shaped in cross-section as viewed radially of the assembly. Each coupling member 22 is secured to a respective one of the segments 20 such as by means of respective screws 22b. Moreover, the upper plate 3 is provided with a circumferential array of equi-distantly spaced, radially extending, T-shaped slots or rabbets in which are constrained, respectively, the coupling members 22 of the segments 20. Each of the T-shaped slots in the upper plate 3 is comprised of an upper wide portion 13 and a lower narrow portion 12. As best illustrated in FIG. 7, the upper wide portion 13 of the slots in the plate 3, is substantially wider than the head portion of the T-shaped coupling member 22 associated therewith. Moreover, the narrow portion 12 of each of the slots in the plate 3 is substantially wider than the body portion of the coupling member 22 associated therewith. Thus, the T-shaped coupling members 22 are slidingly associated with the T-shaped slots in the plate 3 in a substantially friction-free manner, there being a substantial clearance between the plate 3 and the upper portion of each of the segments 20 as denoted by the distance $E_1$ in FIG. 7.

Figure 6:
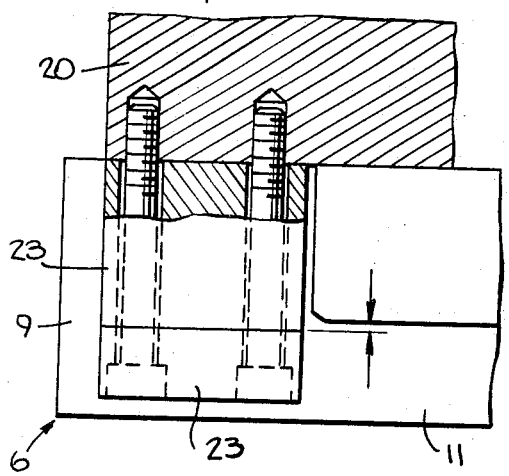
FIG. 6 is an enlarged, fragmentary, partial cross-sectional view taken along the line 6—6 in FIG. 5.
Figure 5:
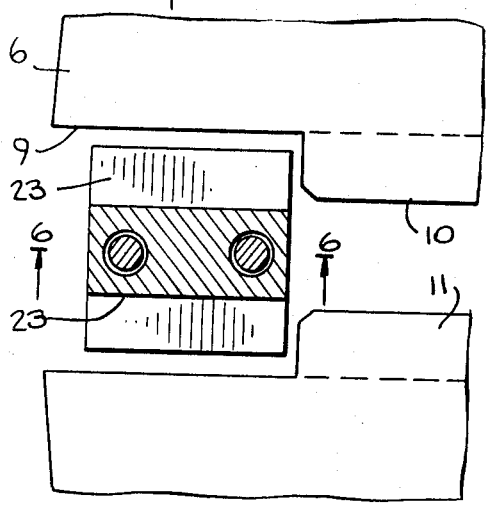
FIG. 5 is a fragmentary, partial cross-sectional view, on enlarged scale, taken long the line 5—5 in FIG. 2, and illustrates the interfitting association of a typical tread-shaping segment of the present invention with the lower sidewall-shaping member.

The lower mold assembly 1 also generally comprises a circular or disc-shaped plate 6 having heating ducts 7 formed therein for confining a heating medium supplied from an external source (not shown). The lower mold assembly 1 is furthermore provided with an outer circumferential array of equi-distantly spaced, radially extending recesses 9. The upper portion of each of the recesses 9 narrow radially inwardly thereof and define T-shaped rabbets 11 such as by means of respective pairs of opposing flange-like portions 10 (FIGS. 5 and 6).

The lower portion of each of the segments 20 is provided with a T-shaped coupling member 23 which is radially offset relative to its respective upper T-shaped coupling member 22. The coupling members 23 are arranged so as to be axially insertable into respective ones of the recesses 9 and then radially shiftable slidingly in the rabbets 11. In order to reduce sliding friction therebetween, the cross-sectional T-shaped extent of each of the coupling members 23 is substantially less than that of the T-shaped rabbets 11.

Each of the segments 20 is provided with an array of heat ducts 24 which communicate with respective ducts of adjacent ones of the segments 20 when the latter present a closed annular array abutting one another. The heating ducts 24 coact to confine a heating medium supplied from an external source (not shown). Moreover, the internal face of each of the segments 20 is provided with an array of ribs 25 which abut respective ribs of adjacent ones of the segments 20 and radially penetrate the tread rubber of an inflated raw tire to produce a desired profile therein during the curing operation.

In operation, as illustrated in FIG. 1, the mold is in an open condition, wherein the upper mold assembly 2 is in an elevated position relative to the lower mold assembly 1. In this position, an uncured tire carcass may be inserted therebetween, such as in a direction along arrow 26. The platen 14 and upper mold assembly 2 then descend (by conventional means not shown) toward the lower mold assembly 1, until the lower coupling members 23 of the segments 20 project fully into their associated recesses 9 presented by the lower plate 6; namely, until the lower surface of each of the segments 20 abuts against the upper surface of the plate 6 adjacent the recesses 9. This position is illustrated in FIG. 2.

Figure 4:
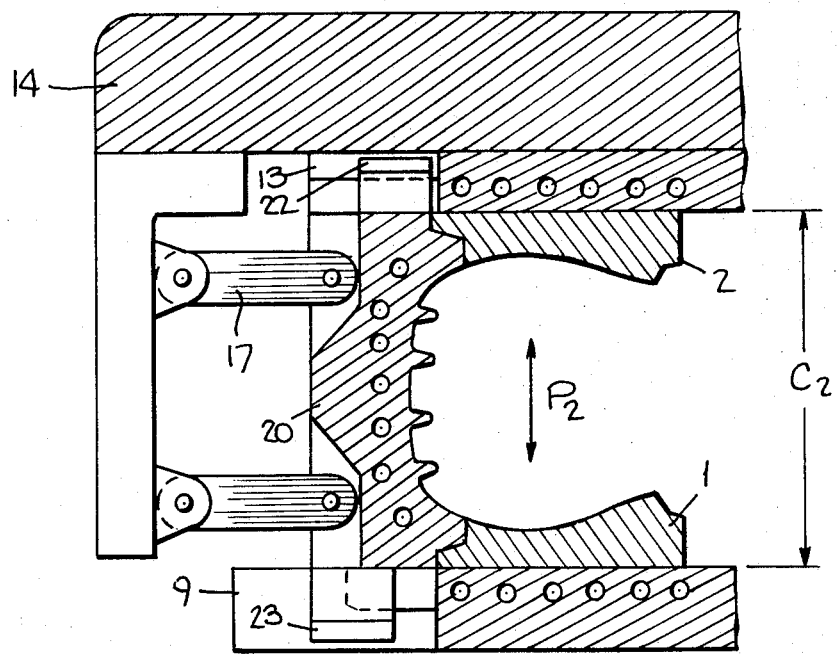
FIG. 4 is a view similar to FIG. 3 wherein the mold in in a final, or fully closed, condition.

Each of the segments 20, in FIG. 2, is in a lower position at a distance 'A' beneath the lower surface of the upper platen 14. Moreover, the segments 20 define with one another an open annular array wherein the segments 20 are slightly spaced from one another. The axial spacing between the upper plate 3 and the underside of the platen 14 can be altered from substantially the spacing 'A' illustrated in FIGS. 1 and 2 to virtually zero as illustrated in FIG. 4. Thus, as the upper platen 14 continues to descend toward the lower stationary plate 6, the links 17 are moved from the position illustrated in FIGS. 1 and 2 to successive positions illustrated in FIGS. 3 and 4. Such movement of the links 17 causes the segments 20 to move both axially relative to the upper platen 14 and radially inwardly in the direction of arrow 32 (FIG. 8). Inward radial movement of the segments 20 will result in the formation thereof of a closed annular array of reduced extent wherein each of the segments abut one another circumferentially and are axially abutted by the upper and lower sidewall-shaping members 5 and 8. In the closed position, the segments 20 and the upper and lower sidewall-shaping segments 5 and 8 define a tightly sealed mold cavity in which the predisposed uncured tire carcass can be properly cured.

Initially, however, as illustrated in FIGS. 2 and 5, the lower coupling member 23 of each segment 20 is just outside of its associated T-shaped rabbet 11 in the plate 6. As the upper platen 14 descends from the position illustrated in FIG. 2 to the positions illustrated successively in FIGS. 3 and 4, the lower coupling members 23 of the segments 20 move radially inwardly of the rabbets 11 associated therewith until the segments 20 abut one another. Since the lower coupling members 23 are substantially narrower than the recesses 9 and T-shaped rabbets 11 radially communicating with the latter, the lower coupling members 23 of each of the segments 20 slide loosely in the rabbets 11 and thereby move relative thereto in a substantially friction-free manner. Similarly, the upper coupling members 22, which are of substantially lesser cross-sectional extent than the T-shaped slots in which they are confined, slide loosely relative to the plate 3 in a substantially friction-free manner.

During the radial substantially friction-free movement of the segments 20, by means of a conventional bladder unit (not shown) the uncured tire carcass is at least partially inflated. The initial inflation pressure $P_1$ tends to push the upper and lower mold assemblies 1 and 2 axially away from one another. However, the extent of spreading of the lower and upper mold units 1 and 2, is delimited by means of the extent of axial "play" permitted by the coupling members 22 and 23 of the segments 20. The extent of spreading of the upper and lower sidewall-shaping members 5 and 8 away from one another is maintained in a range corresponding to the difference in the spacing between distances $C_2$ and $C_1$ denoted in FIG. 3. The relative "play" or slight axial movement of the segments 20 uniformly relative to the upper and lower sidewall-shaping members 5 and 8, is the basis of the relatively friction-free association of these parts with one another during the movement of the segments 20 from the aforementioned open annular array to the closed annular array.

The links 17 extend substantially perpendicular to the axis of the assembly when the segments 20 are in a closed annular array as illustrated in FIG. 4. The spring 'B' between the upper plate 3 and the underside of the upper platen 14, illustrated in FIG. 3, is reduced to virtually zero in FIG. 4 wherein the upper platen 14 presses against the upper plate 3, in the direction of arrows 23 in FIGS. 7 and 8. Thus, there is effected a rigid and tightly sealed mold cavity in which the segments 20 and sidewall-shaping members 5 and 8 are locked against one another, and in which the final effects of the inflation pressure $P_2$ can be realized to permit curing of the raw tire predisposed therein.

Once the raw tire has been properly cured in the mold cavity, the upper platen 14 is elevated relative to the lower mold assembly 1, thereby, resulting in an annular spreading or separation of the segments 20 relative to one another and in their oppositely directed axial movement relative to the platen 14. Thus, what is effected is a reversing of the sequence illustrated in FIGS. 1–4. Since the lower mold assembly 1 remains temporarily coupled to the coupling member 23 during the relaxation of pressure exerted by the platen 14, the segments 20 are prevented from moving over a substantial extent axially relative to one another and the lower mold assembly. Thus, the tread profile formed in the cured carcass is not affected undesirably by the opening of the tread-shaping segments 20.

Resilient means such as springs 29, which are confined in respective recesses 27 formed in the underside of the platen 14 and which confront the upper plate 3 may be utilized for ensuring the separation of the upper plate 3, relative to the platen 14, and thereby the return of the segments 20 to the position illustrated in FIG. 1. The springs 29 are associated with respective lugs 28 extending from the upper surface of the upper plate 3 as best illustrated in FIG. 1. Thus, once pressure is entirely relaxed, the springs 29 return the upper plate 3 to a position at a distance 'A' from the underside of the platen 14, as illustrated in FIG. 2. The coupling members 23 of each of the segments 20 may then be axially removed from the confines of the recesses 9 in the lower plate 6. Now the cured carcass in the form of a completed tire can be removed from the mold.

Accordingly, the nature of the assembly of the segmental mold of the present invention is such that because of the loose interconnection of the coupling portions 22 and 23 of the segments 20 with the upper and lower sidewall-shaping members 5 and 8, the segments 20 may be slidingly moved radially relative to the members 5 and 8 in a substantially friction-free manner. Moreover, only minor radially directed forces are necessary for purposes of moving the segments 20 from an open annular array to the closed annular array. Furthermore, the present invention contemplates the utilization of combinations of metals which are of low friction nature, this obviating the necessity to frequently lubricate the surfaces which slide relative to one another. Additionally, the relationship of the segments with one another is such that, because of the heating ducts provided therein, the segments 20 themselves can be heated directly and more uniformly for purposes of improving the quality of the cured tire.

Figure 9:
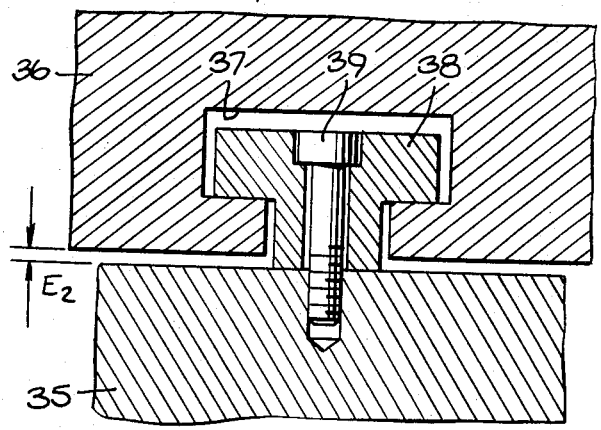
FIG. 9 is a view similar to FIG. 7, but wherein there is illustrated an alternate embodiment of the present invention in which the head portion of the T-shaped slot is of closed extent.

FIG. 9 illustrates an alternate embodiment of the coupling relationship of the tread-shaping segments with the upper mold plate. In this respect, the segments are denoted by reference character 36, whereas the upper plate is denoted by reference character 35. Each of these segments 36 is provided with a generally T-shaped guideway in which is confined a T-shaped coupling member 38. The T-shaped coupling member 38 is secured to the upper plate 35 such as by means of respective screws 39. The axial "play" of the segments 36 relative to the plate 35 is delimited in extent to the spacing $E_2$ illustrated in FIG. 9. Since the coupling members 38 each have a lesser cross-sectional extent than the corresponding extent of the T-shaped guideway 37 in each of the segments 36, the segments 36 and coupling members 38 are loosely associated slidingly with one another in a substantially friction-free relationship as discussed above for the embodiment illustrated in FIGS. 1-8.

Figure 12:
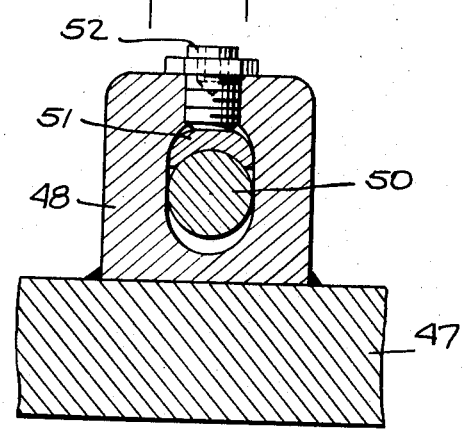
FIG. 12 is a fragmentary, partial cross-sectional view taken along the line 12—12 in FIG. 10.

Referring now to FIGS. 10-12, a preferred form of one or both of the aforementioned links 17 (FIGS. 1-4) is illustrated. The link, in this instance, is denoted generally by the reference character 45. It should be noted, that because of the T-shaped coupling relationship of the coupling members of 22 and 23 with the upper and lower sidewall-shaping members 5 and 8, that only one such link 45 may be necessary for purposes of effecting parallel axial movement of each of the segments 20. However, for purposes of ensuring precise axial, parallel, movement of the segments 20, it is preferred that a pair of links 45 be arranged in a manner as are the links 17 in FIGS. 1-4.

The link 45 is at one end thereof pivotally associated with a tread-shaping segment 40, and at its other end with an annular-like member or skirt 47 (similar to that of the skirt 15 illustrated in FIGS. 1-4). In this instance, however, the skirt 47 may be of octagonal or other multi-sided, closed, geometrical nature corresponding in number of sides to the number of existing tread-shaping segments 40. Each segment 40 is provided with a clevis 42 into which projects an open eye 46 of the link 45. Extending transversely of the clevis 42, and formed in each of the segments 40, is a pair of communicating recesses 41 and 43. The open eye 46 of the link 45 may be constrained in the clevis 42 such as by means of a pivot pin 44 extending through the recesses 41 and 43.

Each of the links 45 increases in dimension or widens a direction toward its opposite end which is secured to the skirt 47. The latter wide end of each of links 45 is supported in a pair of bearing blocks 48 which have openings of elongated cross-section (FIG. 12) in which are constrained respective cushion-like bushings 51 and pins 50. The operative elongate extent of each of the openings is adjustable such as by means of a conventional screw-operated mechanism 52, this permitting slight lengthwise adjustment of the links 45. Between the aforementioned bearing blocks 48 there is provided an additional pair of bushings 53 which can be adjusted perpendicularly of the axial extent of the mold such as by means of screw-operated mechanisms 54. Utilizing the aforementioned mechanisms 52 and 54, the radial position of the pins 50 can be altered so that the final closed position of the segments 40 can be accurately controlled.

As best illustrated in FIG. 11, the bushings 53 also present abutments which coact with corresponding abutments at the end of the link 45. The abutments coact with one another within associated recesses 56 in the link 45 so as to define the extreme opposite angle positions that the link 45 can be moved in directions defined by arrow 57. When in a position as particularly illustrated in FIG. 11, the link 45 maintains the associated segments 40 in a closed annular array. The position of the link 45 relative to the skirt 47 in FIG. 11 corresponds to that of the position of the links 17 in FIG. 4. However, when the abutments of the links 45 and bushings 53 are in contact with one another, such position corresponds to that of the links 17 illustrated in FIG. 1. Thus, the abutments also act as means for supporting the associated segments relative to the skirt 47 in an open condition of preferred extent.

Figure 13:
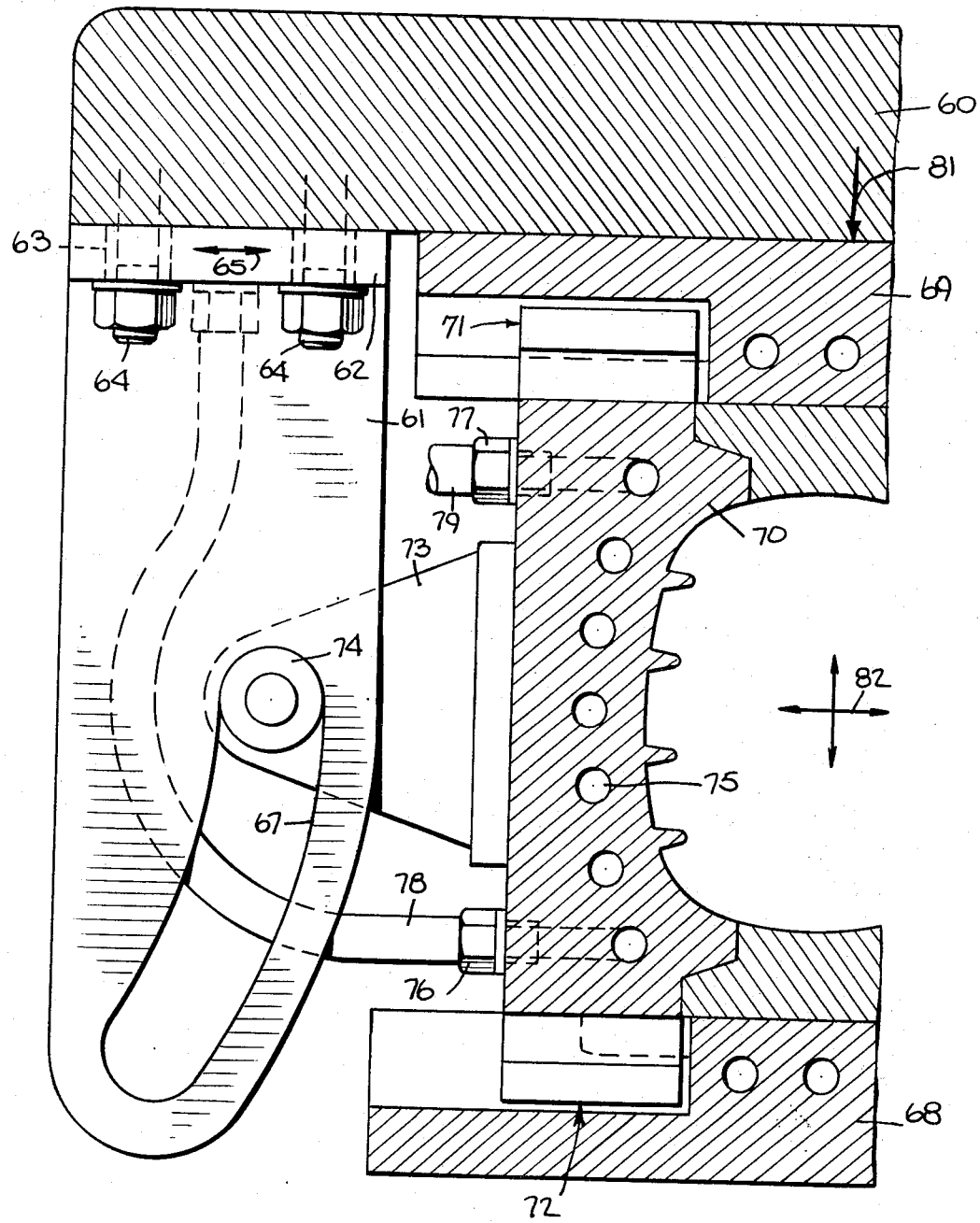
FIG. 13 is an enlarged, vertical or axially taken, cross-sectional view of a further embodiment pursuant to the present invention, and illustrates slotted camming means for shifting the tread-shaping segments radially into a closed annular array.

Still a further embodiment of the present invention is illustrated in FIG. 13. In this embodiment, likewise, the tread-shaping segments are loosely interconnected to the upper and lower sidewall-shaping members. Accordingly, only a minor degree of friction must be overcome and only a small radial force is necessary for moving the segments relative to the sidewall-shaping members in a radial direction. In the embodiment of FIG. 13, the lower mold assembly 68 which mounts a suitable sidewall-shaping member, is detachably coupled with an array of tread-shaping segments, only one of which is shown at 70, such as by means of respective lower T-shaped coupling members 72. Such coupling is effected in a manner similar to that of the coupling of the segments 20 with the lower plate 6 in FIGS. 1-4. Similarly, the upper portion of each of the tread-shaping segments 70 is slidingly coupled by means of a respective T-shaped coupling member 71 with the upper mold assembly 69, the latter which is directly mounted below and movable axially relative to the upper platen 60 in the direction of arrow 81 to permit the segments 70 to move radially outwardly and inwardly relative thereto. The coupling relationship of the coupling members 71 of the segments 70 with the upper mold assembly 69 is likewise similar to that of the coupling of the segments 20 with the upper plate 3 in FIGS. 1-4.

Thus, the upper and lower coupling members 71 and 72 which are generally T-shaped in cross-section are slidably constrained loosely in slightly larger T-shaped rabbets or slots provided in the upper and lower mold assemblies. Since only a minor or relatively small radial force is necessary for moving the segments 70 into the closed, tightly sealed condition illustrated in FIG. 13, the aforementioned links 17 or links 45 may be replaced by respective pairs of slotted members 61 which extend from the underside of the upper platen 60 and are secured to the latter through the intermediary of the flanges 62 and bolts 64. The flanges 62 may be provided with elongate openings 63 to permit adjustment of the position of the slotted members 61 along the underside of the platen 60 in opposite radial directions along arrow 65.

The members 61 of each pair are spaced from one another sufficiently so as to permit insertion therebetween of brackets 73 secured, respectively, to the tread-shaping segments 70. Carried by each bracket 73 are a pair of guide rollers 74 which are constrained in respective cam slots 67 of the members 61. The cam slots 67 are formed such that as the rollers 74 of the segments 70 move therealong, the segments 70 are moved from an open annular array to a closed annular array of reduced extent.

It is important to note that once the lower coupling member 72 is constrained in the lower T-shaped rabbet of the lower mold assembly 68, and during the radial movement of the segments 70 into a position wherein they define a closed annular array, a conventional bladder (not shown) acts to initially inflate a raw tire predisposed within the confines of the mold cavity. This results in pressure exerted universally in the direction of arrows 82 and in a slight axial spreading of the lower mold assembly 68 relative to the upper mold assembly 69. This minimizes the sliding friction associated with the movement of the couplings 71 and 72 within the corresponding T-shaped rabbets of the lower and upper mold assemblies 68 and 69, respectively. Because of the relatively low friction associated with the moving portions, the inclination of the cam slots 67 may be relatively steep axially and still effect a sufficiently large radial force for moving the segments 70 as necessary. It is contemplated, however, as least during the very last stage of movement of the segments 70 into their closed position wherein they abut one another, that the cam slots 67 be of lesser axial steepness so as to effect a greater radial force upon the segments 70 and thereby ensure that there is presented a sufficient radially directed force for rigidly and tightly sealing the mold cavity.

It is likewise contemplated herein that the segments 70 be provided with heating channels 75 which communicate with one another, when in a closed annular array, and with an external supply of a heating medium (not shown). In order to supply the heating channels 75 with the heating medium, inlet and outlet nozzles 76 and 77 are provided which communicate with hoses 78 and 79, respectively, the latter being associated with the aforementioned external heating supply (not shown).

The particular mold illustrated in FIG. 13 is of such a nature that it obviates the necessity for incorporating springs or other servo-mechanisms between the upper sidewall-shaping member and upper platen which would otherwise increase the complexity of the press and take up additional axial space. Despite the rather similified construction and arrangement of the mold in FIG. 13, and likewise that of the embodiment illustrated in FIGS. 1–4, the mold pursuant to the present invention is extremely effective and reliable, and achieves a positive locking of the tread-shaping segments with one another and with the sidewall-shaping members to thereby present a sealed tire-curing mold cavity.

Numerous alterations of the structure herein disclosed will suggest themselves to those skilled in the art. However, it is to be understood that the present disclosure relates to preferred embodiments of the invention which are for purposes of illustration and not to be construed as a limitation of the invention.

What is claimed is:

1. A segmental mold comprising: an upper and a lower annular sidewall-shaping member coaxially confronting one another; means for moving at least one of said members axially relative to the other; an annular array of tread-shaping segments concentrically interposed between said members; means for effecting movement of said segments both axially in parallel relation and radially from an open annular array wherein said segments are spaced from one another to a closed annular array of reduced extent wherein said segments abut one another and define a tire-curing mold cavity; said upper sidewall-shaping member including a circumferential array of radially directed guide means for operative association with said segments, said segments each including an upper end follower means slidably interfitted in respective ones of said guide means, said lower sidewall-shaping member including a circumferential array of radially directed guide means each having an axially open portion for operative association with said segments, said segments each further including a lower end follower means (a) first insertable axially into corresponding ones of said open portions of said guide means and then radially movable along the latter, respectively, when engaged by said lower sidewall-shaping member during mold closure, and (b) slidably removable first radially and then axially from the latter said guide means to permit axial separation therefrom of said lower sidewall-shaping member and a complete opening of the mold.

2. A segmental mold as claimed in claim 1, wherein each of said guide means comprises a radially directed passageway, said follower means each having a cross-sectional contour complimenting the cross-sectional contour of corresponding ones of said passage-ways but of lesser dimension than the latter such that there is presented a friction-reducing clearance therebetween.

3. A segmental mold as claimed in claim 2, wherein said passageways and said follower means are each substantially T-shaped in cross-section.

4. A segmental mold as claimed in claim 2, wherein each of said passageways of said lower sidewall-shaping member terminates in a respective open, outer, upper and wider end into which said lower follower means of said segments are detachably insertable, respectively, axially during initial movement of said segments from said open annular array to said closed annular array, said segments when in a fully opened annular array carrying their respective lower follower means at said open, outer, upper and wider end of each of said passageways and thereby permitting said lower sidewall shaping member to be separated axially from said segments.

5. A segmental mold as claimed in claim 4, wherein said means for effecting movement of said segments comprises a platen having an annular portion surrounding said upper sidewall-shaping member, and a plurality of pairs of links pivotally associated with respective ones of said segments, each link of each said pair of links being pivotally connected for movement in parallel relation with one another to a respective one of said segments and to said annular portion.

6. A segmental mold as claimed in claim 5, wherein said platen is movable axially toward and away from each of said sidewall-shaping members.

7. A segmental mold as claimed in claim 6, including resilient means interposed between said platen and said upper sidewall-shaping member.

8. A segmental mold as claimed in claim 5, wherein at least one link of each of said pairs of links includes bearing means operatively associated with a respective pivot means relative to which said one link is lengthwise adjustable.

9. A segmental mold as claimed in claim 8, wherein each said bearing means includes a cross-sectionally elongate opening surrounding respective ones of said pivot means, and cushion means confined in a portion of each said opening.

10. A segmental mold as claimed in claim 5, wherein each of said links includes bearing means having abutment means for limiting the extent of pivotal movement of said links.

11. A segmental mold as claimed in claim 1, wherein said segments each include heating conduits for confining a heating medium supplied from an external source.

12. A segmental mold as claimed in claim 1, wherein said coupling means comprise metallic material combinations of friction-reducing capacity.

13. A segmental mold as claimed in claim 1, wherein said means for effecting movement of said segments comprises a platen; and means extending from said platen for defining curvilinear camming slots, each said segment including follower means confined in respective ones of said slots for sliding relative to the latter from said open annular array to said closed annular array.

* * * * *